(12) United States Patent
Sexton et al.

(10) Patent No.: US 7,072,919 B2
(45) Date of Patent: Jul. 4, 2006

(54) METHOD FOR PERFORMING DATA MIGRATION

(75) Inventors: Harlan Sexton, Palo Alto, CA (US); Peter Benson, Boulder, UT (US)

(73) Assignee: Oracle International Corporation, Redwood Shores, CA (US)

( * ) Notice: Subject to any disclaimer, the term of this patent is extended or adjusted under 35 U.S.C. 154(b) by 566 days.

(21) Appl. No.: 10/434,431

(22) Filed: May 8, 2003

(65) Prior Publication Data

US 2003/0221022 A1 Nov. 27, 2003

Related U.S. Application Data

(60) Provisional application No. 60/378,391, filed on May 8, 2002.

(51) Int. Cl.
*G06F 17/30* (2006.01)
(52) U.S. Cl. ..................................... 707/206
(58) Field of Classification Search ................ 707/206; 711/170
See application file for complete search history.

(56) References Cited

U.S. PATENT DOCUMENTS 6,564,223 B1    5/2003   Sexton et al.
6,912,553 B1 *  6/2005   Kolodner et al. ........... 707/206

OTHER PUBLICATIONS

U.S. Appl. No. 10/339,707, filed Jan. 9, 2003, Sexton et al.
U.S. Appl. No. 10/434,452, filed May 8, 2003, Sexton et al.
U.S. Appl. No. 10/406,787, filed Apr. 3, 2003, Sexton et al.

* cited by examiner

*Primary Examiner*—Jean M. Corrielus
*Assistant Examiner*—Joon Hwan Hwang
(74) *Attorney, Agent, or Firm*—Hickman Palermo Truong & Becker LLP; Daniel D. Ledesma

(57) ABSTRACT

A method and software for performing data migration is described in which a common data migration driver routine is provided to handle various and disparate kinds of migration operations in a conceptually unified manner. Differences between the migration operations are handled by variations in how the state of the data migration driver routine is initialized, including pointers to low-level routines. Furthermore, a table of actions can be used to direct the basic operation of object copying, external reference created, and object interning.

15 Claims, 5 Drawing Sheets

METHOD FOR PERFORMING DATA MIGRATION

RELATED APPLICATIONS

The present application claims the benefit of U.S. Provisional Patent Application Ser. No. 60/378,391 filed on May 8, 2002, the contents of which are hereby incorporated by reference.

FIELD OF THE INVENTION

The present invention relates to computer systems and more particularly to a memory management method for performing data migration in a dynamic run-time environment.

BACKGROUND OF THE INVENTION

Dynamic run-time environments are responsible for managing objects. Objects are entities that encapsulate data and, in some environments, operations and methods associated with the object. When an object is created, a certain amount of memory is allocated for the object, and when the object is no longer needed, the memory for the object should be deallocated so that it can be reused for other purposes. In dynamic run-time environments, objects are allocated and deallocated throughout the life of program, and memory management for such dynamic objects is crucial to the correctness and performance of dynamic run-time environments.

Many dynamic run-time environments create objects that last as long as the objects are being referenced by a program, and these objects are deallocated when they are no longer referenced through a procedure known as garbage collection. There are many different kinds of garbage collectors, and one approach to garbage collection involves segregating objects based on their lifetimes.

For example, objects can be segregated into categories of newer objects (i.e. those that have been recently allocated) and older objects (i.e. those that have been less recently allocated). When an object is initially allocated, it is allocated in one memory area, and after a certain amount of time, the all the live objects in that memory area are moved into another area, so that only dead objects (i.e. garbage) remains behind.

The performance of such generational garbage collector depends on the efficiency of calculating a root set for all the objects in the first memory area. A root set for a memory space is a set of objects such that the transitive closure of objects in the set (i.e. the set of objects reachable from the object in the root set) contains all the live objects in the memory space. One method of simplifying the root set calculation is to maintain a "remember table," which is a data structure used by the garbage collector to record which objects in the memory space are referenced by objects outside of the memory space.

In run-time environments that permit multiple users to connect in separate, concurrent sessions to a server system, such as a relational database system, garbage collection poses an additional challenge. When designing a run-time environment for such a multi-user environment, scalability in terms of the number of simultaneous users who can establish separate sessions is very important. User scalability is primarily constrained by the size of the memory footprint that each session consumes. For example, a server system may have 100 Mb of memory for supporting all the user sessions. If the session memory footprint is 1 Mb, then only 100 users can be supported at one time. Therefore, it is desirable to reduce the session memory footprint to improve scalability.

One approach for reducing the session memory footprint is to provide a shorter duration memory named "call memory" that is active for the duration of a "call" but automatically deallocated when the call terminates. A call is the period of time when the user is actively using the server, such as a transaction in a database server. Accordingly, those objects that do not need to live beyond the duration of the call are placed in the call memory rather than session memory. When the call is completed, objects in the call memory are deallocated and the call-duration memory is reclaimed for us. This approach has been implemented in Oracle Corporation's PL/SQL™ language, for instance, in which objects are explicitly declared as having the duration of a call or of a session. Memory management in such a language is straightforward because the objects are simply allocated in the memory that corresponds to their duration.

The JAVA™ programming language, however, defines the lifetime of many objects, especially system objects, to extend throughout the duration of a session and does not have the notion of a call or call memory. Accordingly, one approach is to simply ignore the provision of the call memory by the multi-user system and allocate every object in session memory, but this approach suffers from scalability because short-lived objects are unnecessarily allocated in session memory.

Another approach, however, is to allocate objects first in the shorter-duration call memory, and then, at the time the call terminates, migrate the live objects into the longer duration session memory. Dead objects, i.e. those objects that are no longer needed, are not migrated but are freed when the call memory is deallocated. In this other approach, session memory is only increased for the call memory objects that are still alive at the end of the call. One way in which call memory objects can be alive is if a live object in session memory directly or indirectly refers to the call memory object.

Additionally, it is also important to keep track of those references within session memory that refer to locations in call memory. An exit table provides a convenient mechanism for identifying which objects in call memory are still alive because they are directly or indirectly referenced by session memory objects. Accordingly, the exit table is updated when an assignment operation places a reference to a call memory object in a object living session memory, and the check that occurs to determine this happens is also referred to herein as a write barrier. Thus, it is desirable to detect and process, such assignments and update the exit table efficiently.

Accordingly, memory management in a dynamic run-time environment may require many different types of garbage collection operations. For example, session memory needs to be garbage collected, and this operation may be done by copying live session objects from a first session memory space to a second session memory space and releasing the first session memory space. As another example, live objects from call memory need to be copied from call memory into session memory. There are other situations in which a dynamic run-time environment needs to migrate objection. For example, hot-loading a class involves creating static class members in call memory and moving the static class member into a shared memory for other processes to use.

Because of the complexity involved in performed in various garbage collection and data management activities there is a need for an understandable and maintainable approach to data migration.

SUMMARY OF THE INVENTION

These and other needs are addressed by the present invention by providing a common data migration driver routine to handle the various and disparate kinds of migration operations in a conceptually unified manner. Differences between the migration operations are handled by variations in how the state of the data migration driver routine is initialized, including pointers to low-level routines in a preferred embodiment. Furthermore, in the preferred embodiment, a table of actions is used to further control the basic operation of object copying, external reference created, and object interning.

Accordingly, one aspect of the present invention relates to a method and software for performing data migration, in which a list objects to perform the data migration is received. An object is selected from the received list of objects and scanned to identify a reference to another object. For the identified reference, an action is looked up in a table indexed by a memory space of the selected object and a memory space of the other object and, if the action indicates a copy operation, the other object copied. In one embodiment, a reference to a copy routine is received the copy routine is executed via the reference to perform the copy operation.

Another aspect of the present invention involves a method and software for performing data migration by providing a driver routine configured to operate on a list of objects. The driver routine is also configured to select an object from the received list of objects; scan the selected object to identify a reference to another object; and, for the identified reference, look up an action based on a memory space of the selected object and a memory space of the other object and, if the action indicates a copy operation, copying the other object. A migration of objects from a call-duration memory to a session-duration memory may be performed by invoking the driver routine using entries in an exit table as the list of objects, and a garbage collection of objects in the session-duration memory is performed by invoking the driver routine using roots of the session-duration memory as the list of objects.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for performing data migration are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Memory Model

One embodiment of the present invention is illustrated with respect to a memory model that is implemented for a multi-user run-time environment. Accordingly, a detailed description of the memory model for this working example is provided, but the present invention is not limited to this example nor to the use of this specific memory model but can be profitably used with other memory models.

Figure 1:
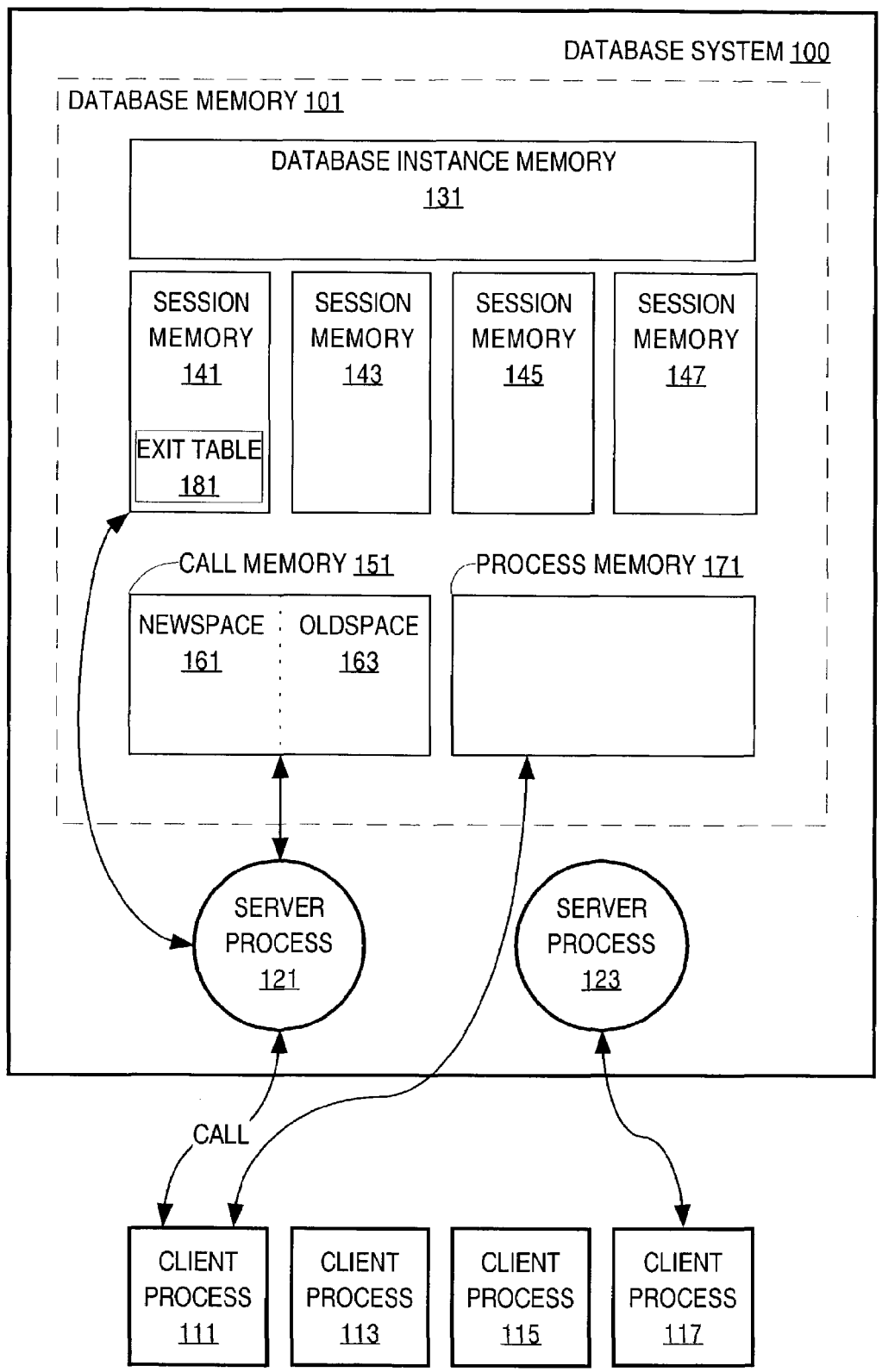
FIG. 1 depicts a memory model that can be used in conjunction with an embodiment of the present invention.

FIG. 1 schematically illustrates a multi-user database system 100 with which a run-time environment for a language such as the JAVA™ programming language may be used, although the present invention is not limited to multi-user database systems in particular and may be applied to other multi-user systems. In the illustrated configuration, client processes 111, 113, 115, and 117 establish database sessions with the database system 100. A database session refers to the establishment of a connection between a client and a database system through which a series a calls may be made. As long as the client remains connected in the database session, the client and the associated database session are referred to as being active. Active clients can submit calls to the database system 100 to request the database system 100 to perform tasks. One example of a call is a query in accordance with the Structured Query Language (SQL), and another example is a method invocation of a JAVA™ programming language object or class, defined for performing a database task for database system 100.

Database system 100 comprises, among other components, a database memory 101 for storing information useful for processing calls and a number of server processes 121 and 123 for handling individual calls. The database memory 101 includes various memory areas used to store data used by server processes 121 and 123. These memory areas include a database instance memory 131, session memories 141, 143, 145, and 147, call memory 151, and a process memory 171. It is to be understood that the number of the session memories, call memories, and process memories in FIG. 1 is merely illustrative and, in fact, the number of such memories will vary over time as various clients make various calls to the database system 100.

The database instance memory 131 is a shared memory area for storing data that is shared concurrently by more than one process. For example, shared memory area may be used store the read-only data and instructions (e.g., bytecodes of JAVA™ programming language classes) that are executed by the server processes 121 and 123. The database instance memory 131 is typically allocated and initialized at boot time of the database system 100, before clients connect to the database system 100.

When a database session is created, an area of the database memory 101 is allocated to store information for the database session. As illustrated in FIG. 1, session memories 141, 143, 145, and 147 have been allocated for clients 111, 113, 115, and 117, respectively, for each of which a separate database session has been created. Session memories 141, 143, 145, and 147 are a shared memory used to store static data, i.e., data associated with a user that is preserved for the duration of a series of calls, especially between calls issued by a client during a single database session. JAVA™ programming language static class variables are one example of such static data.

A call memory, such as call memory 151, is used to store data that is bounded by the lifetime of a call. A database call may include execution of a query or other kind of Structured Query Language (SQL) statements or a group of such statements within a database transaction. When client 111 submits a call to the database system 200, one of server processes 121 or 123 is assigned to process the call. For the duration of the call, the server process is allocated a call memory for storing data and other information for use in processing the call. For example, server process 121 uses call memory 151 and session memory 141 for processing a call submitted by client process 111.

An exit table 181 can be provided to keep track of those references within session memory 141 that refer to locations in call memory 151. The exit table 181 is updated when an assignment operation places a reference to a call memory object in a object living session memory. Maintenance of an exit table is described in greater detail in the co-pending, commonly assigned, U.S. patent application Ser. No. 10/339,707 entitled WRITE BARRIER HANDLING IN A MEMORY MANAGEMENT SYSTEM filed on Jan. 9, 2003 by Sexton et al., the contents of which are hereby incorporated by reference in their entirety herein.

At any given time, a server process (e.g., processes 121, 123) is assigned to process a call submitted by a single client (e.g., clients 111, 113, 115, 117). After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

Process memory 171 is an area of memory that has the duration of a process and can be used to hold the virtual machine state of the process that is not user-specific. In one embodiment, use of the process memory 171 can be selectively available for specific processes. For example, process memory 171 may be available only for those processes that are started in a specific way, and sessions may be attached to such processes only they are intended to run the specific applications (e.g. an application server) that make use of the process memory 171 feature.

Since session memory is allocated for each active client session, user scalability is improved by reducing the memory requirements of session memory 141. The memory requirements for session memory 141 are reduced by keeping some long-living objects in call memory 151 and recreating the objects in call memory 151 before they are used in a subsequent call.

Commonly-assigned U.S. patent application Ser. No. 09/408,847 entitled METHOD AND ARTICLE FOR MANAGING REFERENCES TO EXTERNAL OBJECTS IN A RUNTIME ENVIRONMENT in re Sexton et al. describes one mechanism for keeping long-living objects in call memory 151 by deferring the allocation of objects in call memory 151 until those external objects are actually accessed. This approach employs lazy evaluation for resolving external objects, and by creating external numeric references to the external objects, such that when the external numeric reference is dereferenced.

In accordance with this approach for the lazy evaluation of external references, a stub object for the external object is created in session memory 141. The stub object includes a "descriptor," which is a group of data that identifies the external object and is sufficient to create or recreate the external object. Typically, the descriptor is a string that names to the object or includes directions for loading and initializing the external object, for example, from an identified file in secondary storage. Furthermore, the stub object is associated with a "realize routine," which can be a static member function or a generic function for the stub object's class. The realize routine is responsible for creating or recreating the external object using the information encoded in the descriptor. The implementation of the realize routine and descriptor is dependent on the particular external object and generally is written specifically for that external object or for external objects belonging to a particular class.

When a pointer to the stub object is assigned to a slot in an object, for example during initialization of the object, a run-time external reference is generated based on the pointer to the stub object and stored in the slot instead of the pointer to the stub object. A run-time external numeric reference is a reference to an external object, such that dereferencing the run-time external numeric reference causes the external object to be loaded into virtual memory, if the external object is not currently loaded. In this embodiment, the run-time external reference is implemented as a tagged numeric reference, in which the tag bits indicate that the numeric reference is an external numeric reference and other the non-tag bits of the external reference indicates an index into a descriptor array and a value array. The value array stores pointers to objects in call memory 151 that have been activated; if the entry in the value array corresponding the index is null, then the corresponding descriptor, found by indexing the descriptor array, is used to activate the object in call memory 151 and the address of the activated object is cached in the value array. Accordingly, in this approach, long-living objects are recreated in call memory 151 as when the external numeric reference is dereferenced.

Conceptual Overview of Table-Driven Data Migration

In accordance with one aspect of the present invention, a common data migration driver routine is employed to handle the various and disparate kinds of migration operations in a conceptually unified manner, with the differences between the migration operations being handled by variations in how the state of the data migration driver routine is initialized.

Figure 2:
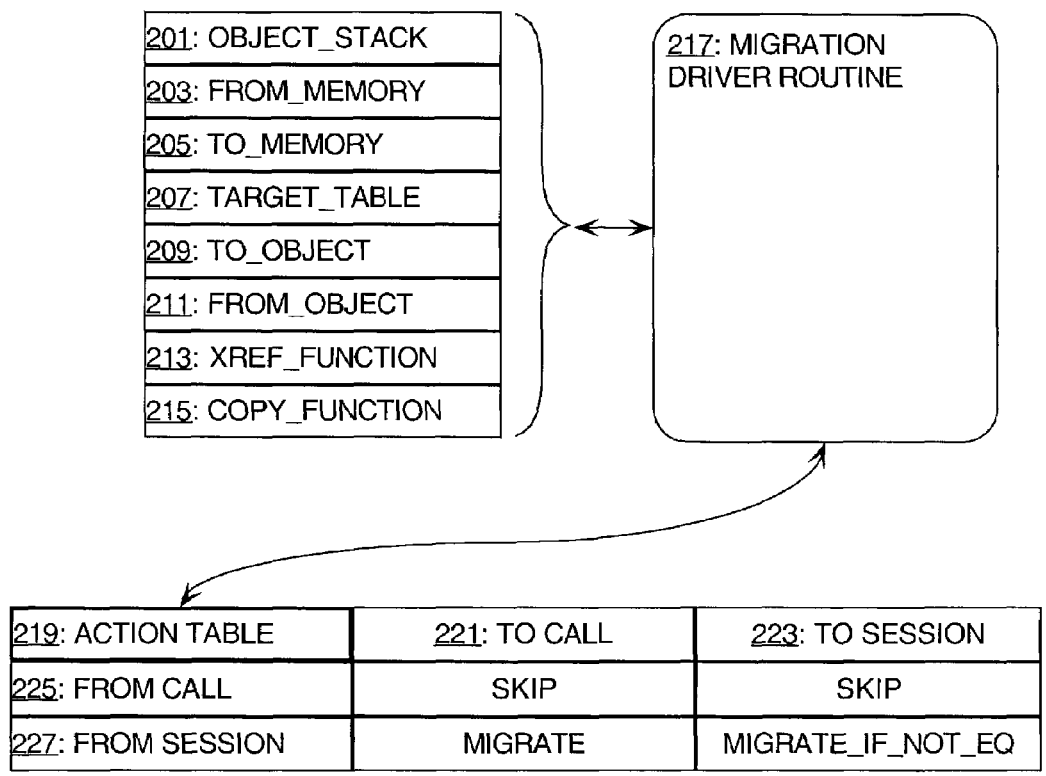
FIG. 2 shows a conceptual overview of an embodiment of the present invention.

Specifically, as illustrated in FIG. 2, such a common data migration driver routine 217 is configured to operate on state that is encapsulated in a migration state structure 200. At the lowest level, the data migration driver routine 217 can use a table 219 of functions or actions indexed by type of memory to direct the basic operation of object copying, external reference created, and object interning. The migration state structure 200, the action table 219, and the operation of the migration driver routine 217 are described in the following sections in greater detail.

Migration State Structure

The migration state structure 200 includes a number of data items that are useful to performing data migration and other memory management function. For example, data item object_stack 201 contains or lists the objects to be processed by the migration driver routine 217. In one implementation, entries on the object_stack 201 include the originating objects rather than the terminal copies that require scanning. This allows for information about the source of pointers and references to be ascertained easily, e.g., whether the source of the reference is in an exit table 181, in a forwarding pointer, or a key in a target table of forwarding references. As the migration driver routine 217 executes, objects are popped off of and pushed onto the object_stack 201, terminating when all objects have been popped off the object_stack 201.

Data item from_memory 203 indicates a source memory space of the migration operation. For example, it can point to a session memory 141, 143, etc. or a call memory 151, etc. The from_memory 203 data item need not be set for migrations for which it is not need. Data item to_memory 205, on the other hand, always makes sense for a migration operation and it indicates the destination memory space of the migration, e.g. session memory 141, 143, etc., or a call memory 151, etc.

Data item target_table 207 can be implemented as a hash table that substitutes for a forwarding pointer when it is not permitted to store a forwarding pointer in a memory space, as in migration from a read-only memory space. The target_table 207 can also be used to map certain pointers to their corresponding external references.

The to_object 209 data item and the from_object 211 data item of the migration state structure 200 are examples of working variables used by the migration driver routine 217. Specifically, the to_object 209 data item indicates the object that is currently being scanning by the migration driver routine 217, and the from_object 211 data item indicates the object from the currently being scanned object came from.

Low-level operations can be specified using indirection to operation-specific routines, two of which, an external reference handing function 213 and copy function 215, are illustrated. These functions are invoked by the migration driver routine 217 when the migration driver routine 217 needs to handle an external reference or copy an object, respectively. These functions may also perform other, administrative operations; for example, the copy function 215 can push either the object it copied or forwarded onto the object_stack 201. Other low-level operations may include an object interning function and a reference remembering function (e.g. to handle certain references in a post-processing step).

The present invention is not limited to the data items of the migration state structure 200 specifically illustrated in FIG. 2, and other data items be used. For example, the migration state structure 200 may include a stack of recorded references that are somehow interesting to a specific type of migration, e.g. from session space 141 to process space 171. For finer control over external references, an external reference mode data item can be used to encapsulate the to/from state of an external reference. Additional data items may be used to help support the use of forwarding pointers, information about the format of slots (e.g. whether a slot must always be a pointer or can hold a tagged external reference).

In the embodiment illustrated in FIG. 2, the migration driver routine 217 is controlled to perform a particular type of data migration by initializing the object_stack 201 data item and the external reference handing function 213 and copy function 215 with the appropriate values. As explained in greater detail below, end-of-call migration is performed by the migration driver routine 217 by initializing the object_stack 201 with entries from the exit table 181 and setting the external reference handing function 213 and copy function 215 to reference routines that are appropriate for end-of-call migration. Session memory garbage collection, on the other hand, is performed by the migration driver routine 217 by initializing the object_stack 201 with roots of the session memory 141 and setting the external reference handing function 213 and copy function 215 to routines appropriate for session memory garbage collection.

Action Table

In order to help coordinate the proper actions to be taken during data migration, one implementation of the migration driver routine 217 accesses an action table 219 that captures the logic of migration between different types of memories. In a full implementation, however, there may be dozens of specialized memory types even of the same lifetimes, e.g. both newspace 161 and oldspace 163 are of a call-duration lifetime. Accordingly, the dimensional size of the action table 219 can be reduced by first characterizing the memory space in terms of a lifetime. For example, both newspace 161 and oldspace 163 are types of call memory 151 with a lifetime of a call. Certain memory types, such as the program stack, that should not be handled by the migration driver, can be mapped to an error.

Accordingly, the action table 219 is a matrix indexed by the memory type or lifetime of the referencing object and the memory type or lifetime of the referenced object. The values in the action table 219 can be integers or other kinds tokens of an enumerated type, pointers to functions, etc. For purposes of convenience of illustration, however, the rows and columns for only the call and session lifetimes are shown, specially, to-call lifetime in column 221, to-session object in lifetime 223, from-call lifetime in row 225, and from-session lifetime in row 227.

The action for references from call memory (indicated in row from-call 225) pointing to call memory (column 221) is SKIP, which means that no relocation is made. The SKIP action is also used for references from call memory (row from-call 225) pointing to session memory (column 223). On the other hand, the action code for references from session memory (row from-session 227) pointing to call memory (column 221) is MIGRATE, which means that the referenced object is to be copied from the call memory 151 into the session memory 141. This is the action that effects the end-of-call migration.

The action code for references from session memory (row from-session 227) pointing to session memory (column 221) is MIGRATE_IF_NOT_EQUAL, which means that the referenced object is to be copied only if the memory spaces are not the same. For example, if the from_memory 203 and the to_memory 205 point to different session memories (e.g. session memory 141 and 143 respectively) as would be the case for a session memory, copying garbage collection, then there would be a migration of the object from one session memory to the other. Conversely, if the session memories are the same, e.g. for a migration operation that is not a session memory, copying garbage collection for in a session memory, copying garbage collection in which the object was already processed and migrated, then action is to not copy the object (i.e. SKIP).

Other action codes in the action table 219 can be SKIP_IF_EQUAL for signaling an error if there is reference between two different hot loaded classes memory spaces, MAKE_XREF to create an external reference, for example, from a session lifetime to class object lifetime, RECORD to record a reference into process memory 171, and ERROR to raise an error condition.

Data Migration Driver Operation

Figure 3:
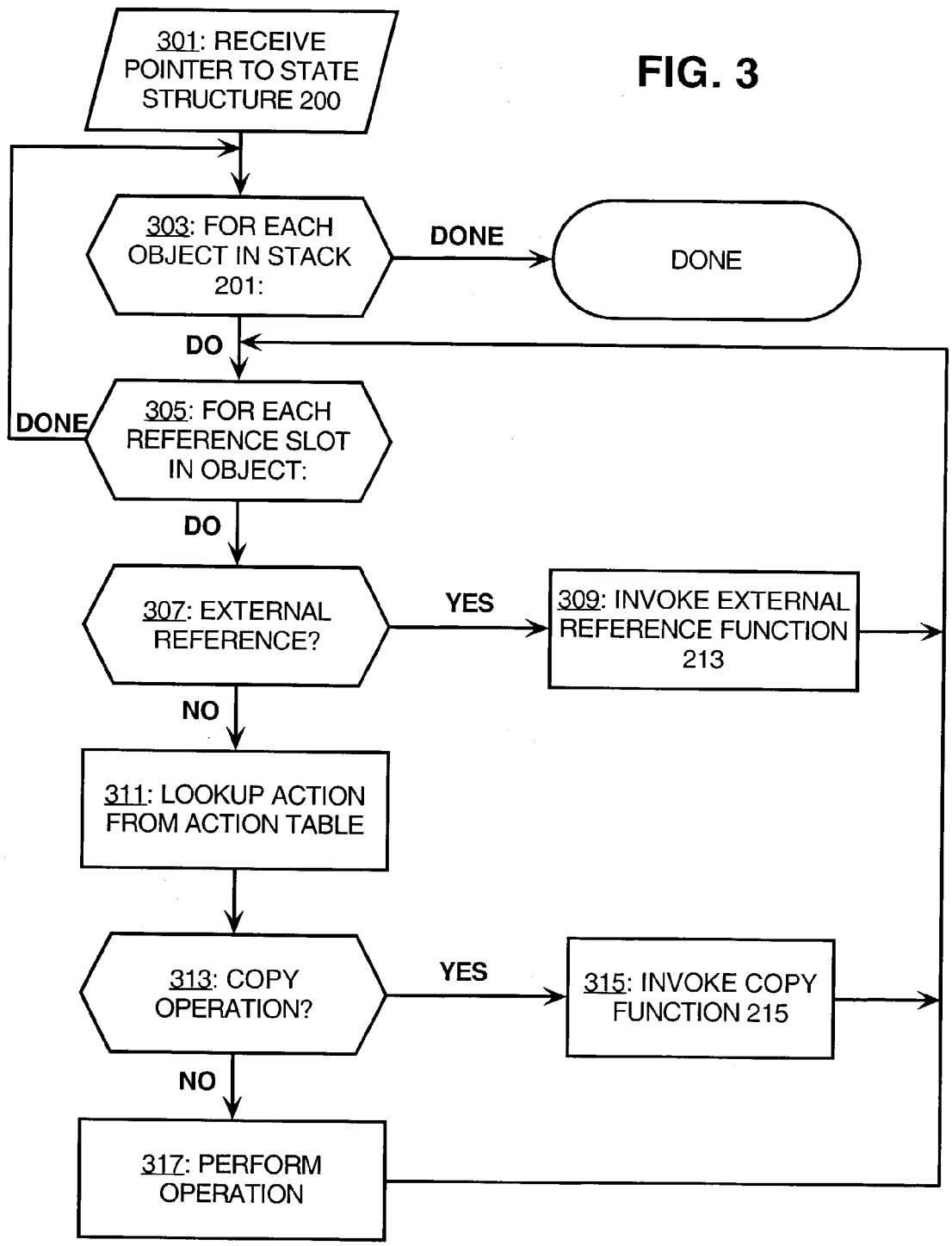
FIG. 3 is a flow chart of an operation of a driver routine in accordance with an embodiment of the present invention.

FIG. 3 is a flow chart illustrating the operation of a driver routine 217 in accordance with an embodiment of the present invention, using the state initialized in the migration state structure 200 and the actions tokens stored in the action table 219. Specifically, at step 301, when the migration driver routine 217 is invoked, the migration driver routine 217 receives a pointer a to the migration state structure 200 that has been initialized in such a manner as to control the migration driver routine 217 to perform a specific type of data migration (e.g. end-of-call processing, session-memory garbage collection, etc.).

Step 303 controls a loop that iterates over each object in the object_stack 201 that are to be processed in the data migration operation. Since additionally objects may be pushed onto the object_stack 201 during the data migration operation (e.g. during execution of the copy function 215), use of the object_stack 201 in effect implements a depth-first search of objects reachable from the set of objects that the object_stack 201 was initialized with. This search of reachable objects implements a transitive closure of objects in the set of objects used to initialize the object_stack 201. Specifically, an object is popped from the object_stack 201 as the current object to be scanned.

Step 305 controls a loop nested with the loop controlled by step 303 to scan the current object, examining each slot of the object and determining whether the slot contains a reference to another object. One method of scanning an object is described in greater detail in the co pending, commonly assigned U.S. patent application Ser. No. 10/434,452, entitled METHOD FOR SCANNING DISCONTIGUOUS OBJECTS and filed on May 8, 2003. by H. Sexton et al., the contents of which are hereby incorporated by reference in their entirety herein.

If, as tested in step 307, the reference in the slot of the scanned object is an external reference or an activatable object (i.e. an object that can be converted into an external reference), then the external reference function 213 is invoked to handle the external reference (step 309). The default action for handing external references is to intern the descriptor that is in the source memory space in the destination memory space. If the reference in the slot points to an activatable object, an external reference is generation, unless the data type of the object is not consistent with an external reference being in the slot, in which case an eager external reference is made for the slot. Eager external references are described in greater detail in the co-pending, commonly assigned U.S. patent application Ser. No. 10/406,767, entitled METHOD FOR MANAGING POINTERS TO EXTERNAL OBJECTS IN A RUN-TIME ENVIRONMENT and filed on Apr. 3, 2003, by H. Sexton et al., the contents of which are hereby incorporated by reference in their entirety herein. The external reference handling function specific to session memory garbage collection, moreover, relocates external references using a relocation array and counter.

If, on the other hand, the slot does not contain an external reference or a reference to an activatable object, then execution proceeds to step 311 where an action token is looked up in the action table 219. Different actions are taken depending on the value of the action token. If the action token indicates a copy operation (e.g. MIGRATE or MIGRATE_IF_NOT_EQUAL, when the memory spaces are not equal), then the appropriate copy function is invoked using the copy function 215 data item in the migration state structure 200. This copy function may also push new objects onto the object_stack 201. Different kinds of copy functions are described in greater detail below with reference to FIGS. 5 and 7. Other actions are performed in step 317 depending on the value of the action token, e.g. signaling an error, making an external reference, or recording a reference to examine later as explained above.

Garbage Collection Using the Migration Driver Routine

Accordingly, the migration driver routine 217 may be used to a variety of different kinds of garbage collection and other memory management tasks for a dynamic run-time environment by initializing the migration state structure 200 with, in one embodiment of the present invention, the object_stack 201 and the low-level functions, including the copy function 217 and the external reference handling function 217.

The object_stack 201 may be initialized using an appropriate remember table or exit table, or by another other means of finding roots such as scanning the program stack. Use of remember and exit tables, however, may, for performance reasons, represent an approximate garbage collection. In an approximate garbage collection, while all live objects are left, some dead objects also remain, but the performance benefit of not being exact out-weighs the marginal improvement of collecting every dead object. With such an approximate garbage collector, it is possible to have a circular data structure that cycles through both a newer and older memory space. In this case, use of remember tables may become too conservative in identifying roots, and the newer space may be shut down. To avoid this issue, one can have the garbage collection of the older space also do a garbage collection of the newer space.

Figure 4:
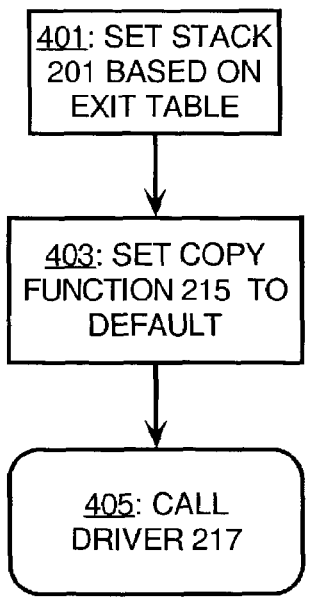
FIG. 4 is a flow chart of an end-of-call migration operation using the driver routine illustrated in FIG. 3 in accordance with an embodiment of the present invention.
Figure 5:
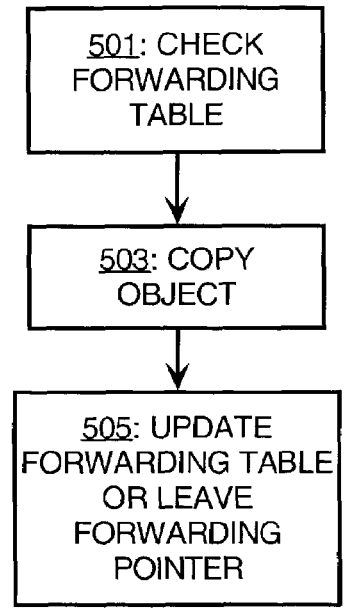
FIG. 5 is a flow chart illustrating of a copy routine for the end-of-call migration operation illustrated in FIG. 4 in accordance with an embodiment of the present invention.

FIG. 4 is a flow chart illustrating how the migration driver routine 217 can be invoked to perform end-of-call migration. At step 401, the object_stack 201 in the migration state structure 200 is initialized to contain the entries in the exit table 181, which is a list of references in session memory 141 that point to objects in call memory 151. At step 403, the copy function 215 is set to the default copy function, whose operation is illustrated in FIG. 5. At step 405, the migration driver routine 217 is invoked using in the migration state structure 200 as initialized in steps 401 and 403.

The operation of the default copy function is illustrated in FIG. 5. At step 501, the forwarding reference table is checked to determine whether the to-object has already been relocated to another location. In step 503, the object is copied unless already relocated, and, in step 505, either a forwarding pointer is stored or the forwarding reference table is updated, depending on whether or not, respectively, the memory space permits modifications to it.

Figure 6:
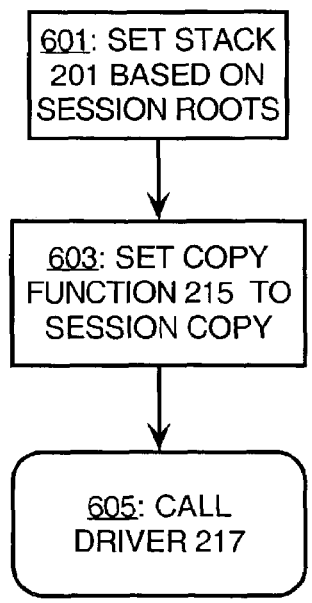
FIG. 6 is a flow chart of a session-memory garbage collection operation using the driver routine illustrated in FIG. 3 in accordance with an embodiment of the present invention.

FIG. 6 is a flow chart illustrating how the migration driver routine 217 can be invoked for performing session memory garbage collection. The basic migration strategy for session memory garbage collection is to always copy, relocating external references but ignoring activatable objects. Various in-memory tables, including one relating to eager external references, may need updating after the copy step.

Figure 7:
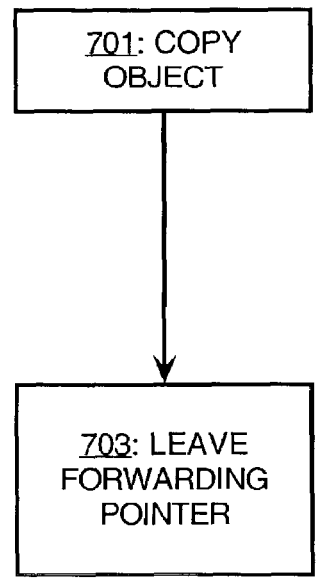
FIG. 7 is a flow chart illustrating of a copy routine for the session-memory garbage collection operation illustrated in FIG. 6 in accordance with an embodiment of the present invention.

Accordingly, at step 601, the object_stack 201 of the migration state structure 200 is initialized to contain the roots of the session memory 141. At step 603, the copy function 215 is set to a copy function specific to copying objects for session memory garbage collection, the operation of which is illustrated in FIG. 7. At step 605, the migration driver routine 217 is invoked using in the migration state structure 200 as initialized in steps 601 and 603.

The operation of the session-space garbage collection copy function is illustrated in FIG. 7. This copy function is simpler than the default copy function, since forwarding pointers can be left in the old session memory. A forwarding pointer is a type of object for relocating objects, specifically, it is stored where an object used to be and points to where the object has been relocated. At step 701, the object is copied unless already relocated via a forwarding pointer, and, in step 703, either a forwarding pointer is stored, since the session memory permits modifications to it.

Other memory management operations can be performed using the migration driver routine 217. For example, as part of a hot-loading operation, objects can be constructed in a call memory 151 or other memory space and moved, using the migration driver routine 217, into a shared memory area. Also, the end-of-call migration can be combined with the session-memory garbage collection in the same call to the migration driver routine 217.

Harware Overview

Figure 8:
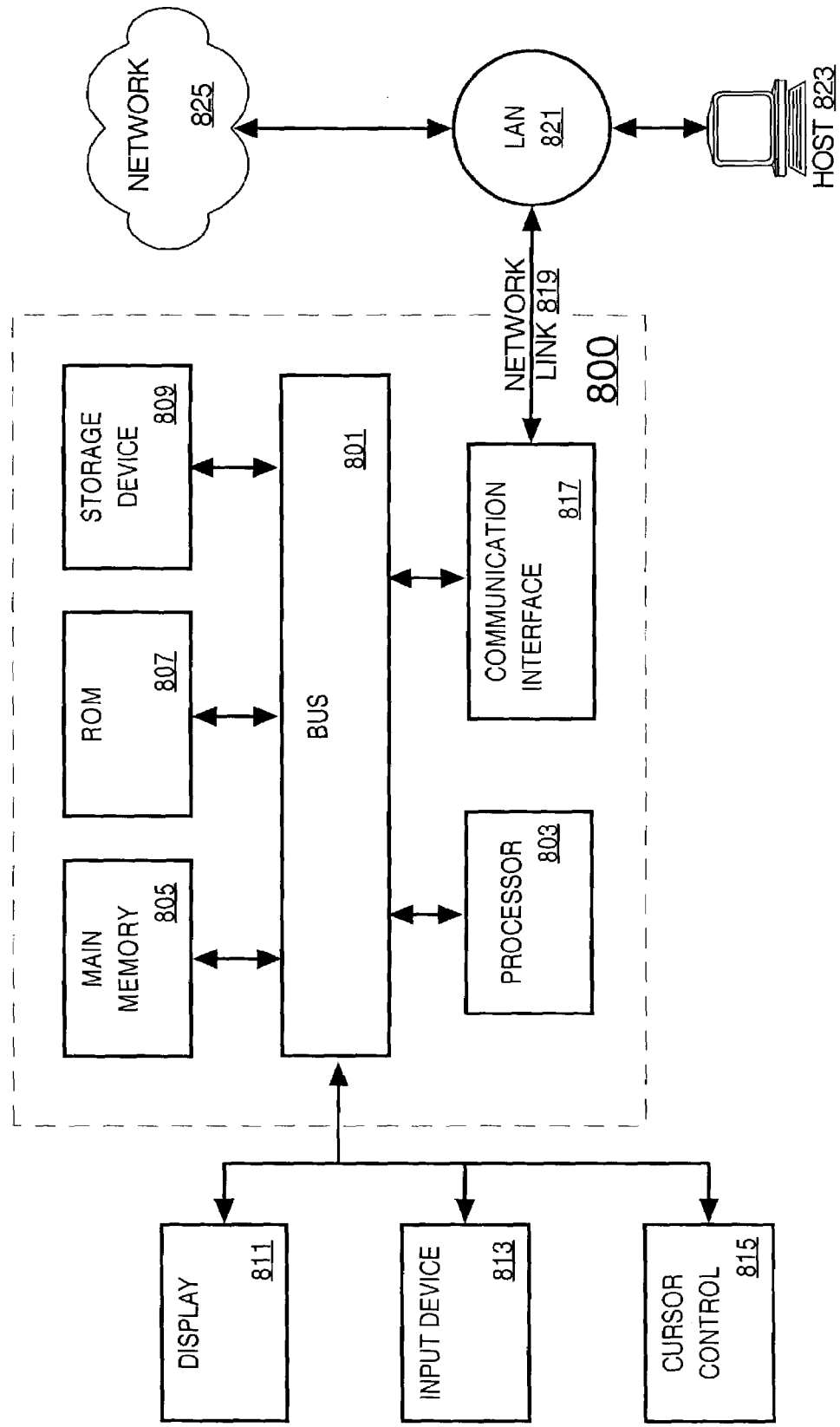
FIG. 8 depicts a computer system that can be used to implement an embodiment of the present invention.

FIG. 8 illustrates a computer system 800 upon which an embodiment according to the present invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, performing data migration is provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the present invention through the network 825, the local network 821 and the communication interface 817. The processor 803 may execute the transmitted code while being received and/or store the code in the storage device 809, or other nonvolatile storage for later execution. In this manner, the computer system 800 may obtain application code in the form of a carrier wave.

The term "computer-readable medium" as used herein refers to any medium that participates in providing instructions to the processor 805 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for performing data migration, comprising:
   receiving a list of objects to perform the data migration;
   selecting an object from the list of objects;
   scanning the selected object to identify a reference to another object; and
   for the identified reference, looking up an action in a table indexed by a memory space of the selected object and a memory space of the other object and, if the action indicates a copy operation, copying the other object to the memory space of the selected object.

2. A method according to claim 1, further comprising:
   generating the list of objects based on an exit table between a call-duration memory and a session-duration memory.

3. A method according to claim 1, further comprising:
   generating the list of objects based on roots of a session-duration memory.

4. A method according to claim 1, further comprising:
   receiving a reference to a copy routine; and
   executing the copy routine via the reference to perform the copy operation.

5. A method according to claim 4, wherein the copy routine comprises an arrangement of instructions configured for:
   checking a table of forwarding references,
   copying the other object to the memory space of the selected object, and
   updating the table of forwarding references if the memory space of the other object does not permit a forwarding pointer to be stored in the memory space of the other object.

6. A method according to claim 4, wherein the copy routine comprises an arrangement of instructions configured for:
   copying the other object to the memory space of the selected object, and
   storing a forwarding pointer in the memory space of the other object.

7. A method according to claim 1, further comprising:
   receiving a reference to an external reference handling routine;
   checking if the reference to the other object is an external reference; and
   if the reference to the other object is an external reference, then executing the external reference handling routine.

8. A computer-readable storage medium bearing instructions for performing data migration, said instructions arranged, upon execution by one or more processors to perform the method according to claim 1.

9. A method for performing data migration, comprising:
   providing a driver routine comprising an arrangement of instructions
      configured to operate on a list of objects by:
      selecting an object from the list of objects;
      scanning the selected object to identify a reference to another object; and
      for the identified reference, looking up an action in a table indexed by a memory space of the selected object and a memory space of the other object and, if the action indicates a copy operation, copying the other object to the memory space of the selected object;
   performing a migration of objects from a call-duration memory to a session-duration memory by invoking the driver routine using entries in an exit table as the list of objects; and performing a garbage collection of objects in the session-duration memory by invoking the driver routine using roots of the session-duration memory as the list of objects.

10. A method according to claim 9, further comprising:
receiving a reference to a copy routine; and
executing the copy routine to perform the copy operation.

11. A method according to claim 10, wherein performing the migration of the objects from the call-duration memory to the session-duration memory includes using a copy routine that comprises an arrangement of instructions configured for:
checking a table of forwarding references,
copying the other object to the memory space of the selected object, and
updating the table of forwarding references if the memory space of the other object does not permit a forwarding pointer to be stored in the memory space of the other object.

12. A method according to claim 10, wherein performing the garbage collection of the objects in the session-duration memory includes using a copy routine that comprises an arrangement of instructions configured for:
copying the other object to the memory space of the selected object, and
storing a forwarding pointer in the memory space of the other object.

13. A computer-readable storage medium bearing instructions for performing data migration, said instructions arranged, upon execution by one or more processors to perform the method according to claim 9.

14. A method for performing data migration, comprising:
providing a driver routine comprising an arrangement of instructions configured to operate on a list of objects and a reference to a copy routine by performing the steps of:
selecting an object from the list of objects;
scanning the selected object to identify a reference to another object; and
for the identified reference, looking up an action in a table indexed by a memory space of the selected object and a memory space of the other object and, if the action indicates a copy operation, executing the copy routine;

performing a migration of objects from a call-duration memory to a session-duration memory by invoking the driver routine using entries in an exit table as the list of objects and a first copy routine as the copy routine, wherein the first copy routine comprises an arrangement of instructions configured for checking a table of forwarding references, copying the other object to the memory space of the selected object, and updating the table of forwarding references if a memory space of the other object does not permit a forwarding pointer to be stored in the memory space of the other object; and performing a garbage collection of objects in the session-duration memory by invoking the driver routine using roots of the session-duration memory as the list of objects and a second copy routine as the copy routine, wherein the second copy routine comprises an arrangement of instructions configured for copying the other object to the memory space of the selected object and storing a forwarding pointer in the memory space of the other object.

15. A computer-readable storage medium bearing instructions for performing data migration, said instructions arranged, upon execution by one or more processors to perform the method according to claim 14.

\* \* \* \* \*